US009327738B2

(12) United States Patent
Elstorpff et al.

(10) Patent No.: US 9,327,738 B2
(45) Date of Patent: May 3, 2016

(54) BRAKE CONTROL DEVICE FOR A BRAKE SYSTEM OF A RAIL VEHICLE, BRAKE SYSTEM, RAIL VEHICLE AND METHOD FOR OPERATING A BRAKE CONTROL DEVICE

(75) Inventors: Marc-Gregory Elstorpff, Munich (DE); Marco Nock, Feldkirchen (DE); Miriam Van De Löcht, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 57 days.

(21) Appl. No.: 14/342,697

(22) PCT Filed: Sep. 7, 2012

(86) PCT No.: PCT/EP2012/067570
§ 371 (c)(1),
(2), (4) Date: Mar. 10, 2014

(87) PCT Pub. No.: WO2013/034734
PCT Pub. Date: Mar. 14, 2013

(65) Prior Publication Data
US 2014/0229042 A1    Aug. 14, 2014

(30) Foreign Application Priority Data
Sep. 9, 2011    (DE) .......................... 10 2011 113 025

(51) Int. Cl.
*B61H 13/00*    (2006.01)
*B60T 8/17*    (2006.01)
(Continued)

(52) U.S. Cl.
CPC .............. *B61H 13/00* (2013.01); *B60T 8/1705* (2013.01); *B60T 13/665* (2013.01); *B60T 17/228* (2013.01)

(58) Field of Classification Search
None
See application file for complete search history.

(56) References Cited

U.S. PATENT DOCUMENTS

| 5,201,834 | A |   | 4/1993 | Grazioli et al. |
| 5,327,782 | A | * | 7/1994 | Sato et al. ........................ 73/129 |
| 5,744,707 | A | * | 4/1998 | Kull ................................. 73/121 |

(Continued)

FOREIGN PATENT DOCUMENTS

| DE | 3234727 A1 | 3/1984 |
| DE | 4316993 A1 | 11/1994 |

(Continued)

OTHER PUBLICATIONS

International Preliminary Report on Patentability and Written Opinion of the International Search Authority for International Patent Application No. PCT/EP2012/067570, dated Sep. 7, 2012.

(Continued)

*Primary Examiner* — Mussa A Shaawat
*Assistant Examiner* — Kyung Kim
(74) *Attorney, Agent, or Firm* — Barnes & Thornburg LLP

(57) ABSTRACT

A brake control device for a brake system of a rail vehicle, wherein the brake control device detects strain during a braking process on at least one friction brake device actuated during the braking process, the brake control device further stores wear data based on the detected strain in a memory device. Also disclosed is a brake system for a rail vehicle having such a brake control device, a rail vehicle having such a brake system and/or such a brake control device, and a method for operating a brake control device for a brake system of a rail vehicle.

8 Claims, 2 Drawing Sheets

(51) Int. Cl.
*B60T 17/22* (2006.01)
*B60T 13/66* (2006.01)

(56) References Cited

U.S. PATENT DOCUMENTS

| | | | |
|---|---|---|---|
| 6,634,465 B1 * | 10/2003 | Tuschen | B60T 13/04 |
| | | | 188/1.11 L |
| 7,117,137 B1 | 10/2006 | Belcea | |
| 8,560,198 B2 * | 10/2013 | Itano | 701/70 |
| 2004/0138791 A1 * | 7/2004 | Dewberry et al. | 701/29 |
| 2009/0255329 A1 * | 10/2009 | Connell et al. | 73/121 |
| 2012/0018260 A1 * | 1/2012 | Nock | 188/72.1 |
| 2012/0277940 A1 * | 11/2012 | Kumar et al. | 701/20 |
| 2014/0190512 A1 * | 7/2014 | Elstorpff | 134/1 |
| 2014/0222258 A1 * | 8/2014 | Elstorpff et al. | 701/19 |
| 2014/0222284 A1 * | 8/2014 | Herden et al. | 701/34.4 |
| 2014/0246282 A1 * | 9/2014 | Elstorpff et al. | 188/165 |

FOREIGN PATENT DOCUMENTS

| | | |
|---|---|---|
| DE | 10029238 A1 | 12/2001 |
| DE | 102006011963 B3 | 8/2007 |
| DE | 102006029699 A1 | 1/2008 |
| DE | 102007006131 A1 | 8/2008 |
| EP | 1950111 A2 | 7/2008 |
| WO | 2010069520 A2 | 6/2010 |

OTHER PUBLICATIONS

English Translation of International Preliminary Report on Patentability and Written Opinion of the International Search Authority for International Patent Application No. PCT/EP2012/067570, dated Sep. 7, 2012.

Search Report for International Patent Application No. PCT/EP2012/067570; May 29, 2013.

* cited by examiner

BRAKE CONTROL DEVICE FOR A BRAKE SYSTEM OF A RAIL VEHICLE, BRAKE SYSTEM, RAIL VEHICLE AND METHOD FOR OPERATING A BRAKE CONTROL DEVICE

PRIORITY CLAIM

This patent application is a U.S. National Phase of International Patent Application No. PCT/EP2012/067570, filed 7 Sep. 2012, which claims priority to German Patent Application No. 10 2011 113 025.3, filed 9 Sep. 2011, the disclosures of which are incorporated herein by reference in their entirety.

FIELD

Disclosed embodiments relate to a brake control device for a brake system of a rail vehicle, a brake system for a rail vehicle having a brake control device of this kind, a rail vehicle and also a method for operating a brake control device for a brake system of a rail vehicle.

BACKGROUND

Modern rail vehicles may have a plurality of different kinds of brake devices. There is usually a pneumatic brake system present in a rail vehicle, which can slow the vehicle down through the pneumatic operation of friction brake devices. In addition, there are electromagnetic rail brakes and eddy current brakes, for example. Eddy current brakes can achieve wear-free braking of a vehicle. Friction pairs in contact with one another are subject to a considerable load during the operation of friction brake devices. A friction pair of this kind may comprise, for example, a disk of a brake disk and a brake lining of a brake shoe in the case of a disk brake or a lining of a brake shoe and a wheel tread in the case of a shoe brake. Brake linings in particular are subject to a high degree of wear in this case. The wear on individual brake linings must be regularly checked as part of expensive maintenance routines, to guarantee the brake's functionality. However, the rail vehicle cannot be used for operation during this kind of maintenance.

Disclosed embodiments provide improved wear monitoring, on the basis of which wear-optimized operation of a brake system on a rail vehicle is possible.

BRIEF DESCRIPTION OF THE FIGURES

Disclosed embodiments will be explained by way of example with reference to the accompanying drawings, in which.

DETAILED DESCRIPTION OF THE DISCLOSED EMBODIMENTS

Figure 1:
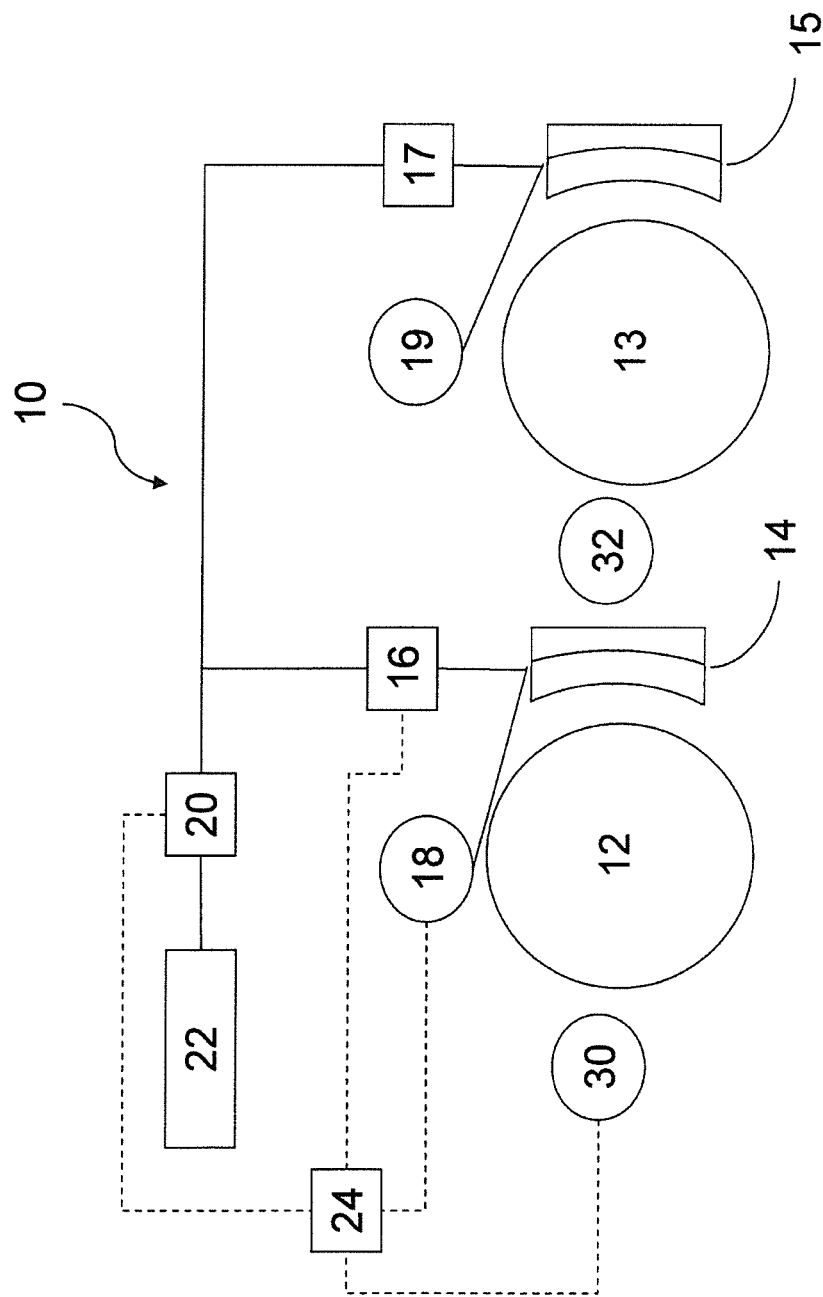
FIG. 1 shows a schematic representation of a brake system of a rail vehicle with a brake control device.

Within the framework of this description, a rail vehicle may refer to one or a plurality of rail cars with or without their own drive system and/or a tractor vehicle in any combination. A rail vehicle may particularly comprise a traction unit. A brake system may be a hydraulic, particularly an electrohydraulic, or pneumatic, particularly an electropneumatic, brake system. It is conceivable for the brake system to be an electrical or electromagnetic brake system.

A brake system may have at least one corresponding brake device. A pneumatic or hydraulic brake device which is able to convert a pneumatic or hydraulic brake pressure into a braking force can be regarded as a pressure-operated brake device. An electrical or electromechanical brake device can convert an electrical brake current into a braking force and may be regarded as an electrically operated brake device. A main control valve device of the brake system may be provided, which is able to supply a brake pressure for one or a plurality of pneumatic or hydraulic brake devices.

A main control valve device may be designed to supply the brake pressure in accordance with an electronic control device. It may be provided that the main control valve device is able to convert a venting pressure into a brake pressure, for example by pressure amplification and/or pressure conversion to a greater volume. An electropneumatic or electrohydraulic brake system may particularly comprise electrically actuatable valves, such as solenoid valves and/or electrically actuatable pilot valves.

A brake device of a brake system may be provided for application of the brake to a single wheel and/or an axle of the rail vehicle. A brake device, particularly a pneumatic or hydraulic brake device, may exhibit an actuator such as a pressure-operated cylinder, which may particularly be a pneumatic or hydraulic cylinder and which operates a friction brake device when exposed to pressure. It is also conceivable for a brake device to have at least one actuator which operates a friction brake device when supplied with a brake current. A friction brake device is provided to achieve braking through a friction contact between two components of a friction pair moving relative to one another.

A friction pair may generally comprise a brake lining and an associated friction surface, such as a wheel tread or a braking surface of brake disk, for example, which are brought into frictional contact with one another during braking. A friction brake device in this case may be a disk brake, for example, with a brake disk which is operated in that one or a plurality of friction braking elements, such as brake shoes with a brake lining, are brought into frictional contact with the brake disk via a brake caliper.

A further example of a friction brake device may be a brake block with a brake lining which can be operated by an actuator, such as a pressure-operated cylinder, such that the brake block comes into frictional contact with a wheel tread. It is conceivable for a friction brake device to be provided in each case to brake a single wheel or an axle.

A pressure exerted on the actuator or the pressure-operated cylinder may be referred to as the brake pressure. Similarly, an electrical current for operating an actuator is referred to as the brake current. The force exerted during operation of a friction brake device by the actuator can be referred to as the braking force. The braking force depends on the brake pressure applied or the brake current and also on the design and method of operation of the friction brake device. The brake torque may be referred to as the torque which is exerted on a wheel for braking.

A braking force may be exerted on a stationery wheel. A brake torque occurs if a braking force is applied to a moving wheel. The brake torque depends particularly on the braking force and on the geometry of the wheel, particularly the wheel diameter. By exerting a braking force or a brake torque on a friction brake device, a particular load is placed on the friction brake device, particularly on a contact surface between two elements of a friction pair moving against one another. In this case, a particular braking energy may be introduced into the friction brake device as the load. This load or energy leads to wear due to the warming of the surfaces rubbing against one another and due to wear of the brake lining, for example. An electronic control device may be a brake control device for a brake system of a rail vehicle. The brake control device may, for example, be an anti-skid protector, a brake calculator or another control device designed to control the brake system of a rail vehicle. A connection for data transmission may generally be referred to as a radio link and/or a wired link, via an optical cable and/or electrically conductive wires, for example.

Disclosed embodiments relate to a brake control device for a brake system of a rail vehicle, which is designed to determine a load of at least one friction brake device operated during the braking process, wherein the brake control device is additionally designed to store wear data based on the determined load in a memory device. In this way, an inference can be made as to the wear of the friction brake device without a visual inspection of the brake lining being required, based on a load on a friction brake device. This means that maintenance cycles can be extended and the control and/or regulation of the brake system improved.

Determining a load for an operated friction brake device may involve collecting and/or receiving data which indicate the load or enabling the load to be calculated and/or estimated by the brake control device. Determining a load may involve calculating and/or estimating the load based on corresponding data, for example. Data of this kind may particularly be data which specify a braking force and/or a brake torque which is applied during braking to the elements of the friction brake device rubbing against one another or to the wheel.

The brake control device may be designed to determine a load based on experimentally determined data for a friction brake device and/or a model of the friction brake device. The suspension of the friction brake device on a vehicle, for example on a bogie, can be taken into account in this case. Corresponding predetermined data or model parameters can be stored in a memory device of the brake control device. The brake control device may be designed to determine a load over a given interval of time. It may be provided that the brake control device is designed to determine a course of a load over time during the braking process. In this way, a change of a braking force exerted on a friction brake device or of the brake torque or of the load during braking can be collected.

The memory device may be connected or connectable to the brake control device or designed as part of the brake control device. The determined load may correspond to an application of energy to the friction brake device during the braking operation, particularly an application of energy to one or a plurality of frictional components, such as a brake lining, for example. The load may be parameterized as the application of energy to the friction brake device. Wear data may be based on a model of the friction brake device which introduces an exerted braking force and/or a brake torque into the friction brake device in relation to an application of energy to the friction brake device.

It may be advisable for the brake control device to be designed to store the wear data on a plurality of braking processes. In particular, the brake control device may be designed to monitor the wear on a friction brake device based on the wear data over a prolonged period. The wear data may be based on data determined by further processing of the determined load. It may be provided that wear data are determined or calculated through mathematical transformations or conversions from load data. It is also conceivable for a determined load to be directly stored as a wear datum. The wear data for a given friction brake device may have at least one parameter which represents a total of the energy applications into the associated friction brake device over a plurality of brake applications and/or a prolonged period of time.

A prolonged period of time may particularly extend over one or a plurality of journeys. Corresponding data storage may be initiated following an exchange of friction elements, for example, such as a change of brake lining or a maintenance operation. It is conceivable for an associated energy application or determined load to be stored separately, in addition or alternatively for individual brake applications in each case. Based on wear data for individual brake applications, disproportionately high loads or disproportionately high wear, for example, on a friction brake device with particularly hard brake applications with a high brake pressure or brake current can be taken into account when assessing wear. The brake control device may be designed to determine and/or estimate wear on a friction brake device, particularly a brake lining, based on the wear data. For example, a corresponding total energy application can be used for the parameterization of wear on a brake lining and/or a friction brake device. A total energy application in this case may be the total applications of energy over the period of time under consideration, for example the total energy applications since storage began. Wear data may be assigned to a friction element, a friction pair and/or a friction brake device in each case.

In at least one disclosed embodiment, the brake control device may be designed to determine the load of a plurality of friction brake devices during a braking process and to store wear data for each of the friction brake devices, which are each assigned to the corresponding friction brake device of the plurality of friction brake devices. In this way, wear monitoring can take place for a plurality of friction brake devices. In particular, individual wear monitoring can be carried out for each of the friction brake devices.

The brake control device may be designed to actuate the brake system based on wear data. Consequently, a wear-optimized brake application can take place. The wear data may be read from a memory device for this purpose. Individual or a plurality of friction brake devices and/or associated valve devices of the brake system may be actuated. Wear-optimized actuation of the friction brake devices can take place during a brake application, during which not all friction brake devices need be applied to maximum effect, particularly during adjustment braking.

The brake control device may be designed to actuate a plurality of friction brake devices asymmetrically based on the wear data. Asymmetric actuation may involve the operation of different friction brake devices with different brake pressures or brake currents and/or the exertion of different braking forces and/or brake torques on different friction brake devices.

The brake control device may be designed to conduct actuation based on a braking requirement by a driver or a control device. It may be provided that the brake control device is able to determine and actuate asymmetric control based on a braking requirement and the wear data to meet the braking requirement. It may be provided in this case, for example, that friction brake devices with high wear are supplied with a lower brake pressure than friction brake devices that have hitherto exhibited less wear. It is clear that in this case the brake system is designed accordingly to facilitate an asymmetric supply of friction brake devices with brake pressure or brake current. For this purpose, friction brake devices or pressure-operated brake devices may be assigned control valve devices. Based on a brake pressure supplied by a main control valve device, an individual brake pressure can be set via control valve arrangements of this kind.

Control valve devices of this kind may comprise discharge valves that are controllable through a control device, for example. For the asymmetric supply with brake current, the control device may be designed to actuate one or a plurality of current supplies in such a way that they provide the desired brake currents. The wear on friction brake devices can thereby be homogenized over the rail vehicle. It is conceivable for asymmetric control to be carried out based on additional data in relation to individual friction brake devices and/or associated wheels. For example, wheel slippage on a wheel assigned to a friction brake device can be monitored. Suitable wheel speed sensors and/or speed sensors may be provided for this purpose.

The brake control device may be designed to carry out a wear-dependent actuation of the friction brake devices based on the wheel slippage and/or based on a frictional connection between the wheel and the track. It may be provided in this case that the brake control device is designed to operate friction brake devices with a high frictional connection and/or particularly suitable wheel slippage with a high brake pressure or brake current and to operate friction brake devices with a lower frictional connection with lower brake pressure.

It is conceivable that the brake control device is designed to perform actuation of the friction brake devices according to a brake specification such that optimum wear results overall. It may be taken into account, for example, that the load on a friction brake device at a given brake pressure can change due to wear, particularly due to wear of the brake linings. Optimized wear may, for example, correspond to a minimum total load caused during a brake application on one or a plurality of friction brake devices being actuated.

It may be provided in this case that the brake control device is able to actuate one or a plurality of friction brake devices in such a manner that the total load, for example the total energy applications to all friction brake devices observed, is minimized during a brake application.

The brake system may, in particular, be a pneumatic brake system which has at least one pneumatically operable friction brake device. Brakes of this kind are frequently used as the service brake on the rail vehicle and are therefore subject to a particularly high load. The at least one friction brake device may be part of a pneumatic brake device. Alternatively, the brake system may be a hydraulic brake system which, accordingly, has at least one hydraulically operable friction brake device and/or a corresponding actuator. It is also conceivable for the brake system to be an electrical or electromagnetic brake system which, accordingly, has at least one electrically operable friction brake device and/or a corresponding actuator.

The brake control device may be designed to emit a signal based on the wear data which contains information relating to the at least one friction brake device. For example, the brake control device may be set up to output and/or display wear data, to facilitate simplified maintenance. It may be particularly provided that the brake control device is designed to emit a signal when a determined level of wear or an associated wear data parameter exceeds a predetermined threshold value, which signal indicates a greater maintenance requirement on the part of the associated friction brake device. In this way, friction brake devices in greater need of maintenance can be identified. A signal may be transmitted to a suitable display device and/or to a further control device by the brake control device.

The brake control device may be connected or connectable to a sensor device capable of transmitting data to the brake control device, on the basis of which data the brake control device is able to determine the load. The sensor device may particularly comprise one or a plurality of sensors which are designed to detect a braking force and/or a brake torque. A friction brake device may be particularly assigned to a sensor for braking force and/or brake torque.

The braking force exerted on a friction brake device or the brake torque exerted on a wheel is a good indicator of a load on a friction brake device during a braking process. In addition, the brake control device may be set up to determine an energy application to the friction brake device based on a braking force detected by the sensor device and/or a brake torque which is exerted on a wheel or on a friction brake device. The energy application may be determined based on a model of the friction brake device.

In addition, a brake system for a rail vehicle with a brake control device described herein is provided. The brake system may comprise one or a plurality of sensor devices, for example, which is/are connected or connectable to the brake control device for the transmission of data. It is conceivable for the brake system to comprise one or a plurality of friction brake devices.

The brake control device may be designed to actuate the friction brake devices of the brake system, based on the wear data, for example. The brake system may, in addition, comprise pneumatic or hydraulic lines and valve devices. One or a plurality of valve devices of this kind may be capable of being actuated by the brake control device. In particular, a main control valve device may be provided which can be actuated by the brake control device and via which a brake pressure for the friction brake devices or pneumatic actuators assigned thereto can be supplied.

The brake system may comprise at least one electrically operated actuator and/or at least one corresponding brake device. It may be provided that individual friction brake devices are each assigned additional valve devices which can be actuated by an anti-skid protector and/or by the brake control device, to modify individually a brake pressure provided by the main control valve device. In this way, asymmetrical actuation of the friction brake devices can particularly take place, in other words actuation of the friction brake devices with different brake pressures and/or a different braking force.

Disclosed embodiments relate to a rail vehicle having a brake system as described herein and/or a brake control device as described herein.

Disclosed embodiments also relate to a method of operating a brake control device for a brake system of a rail vehicle comprising the steps of determining, by means of the brake control device, a load of at least one friction brake device of the brake system actuated during a braking process and storing, by means of the brake control device, wear data based on the determined load. The brake control device may be one of the brake control devices described herein. It is conceivable for the brake system to be one of the brake systems described herein. The load of a plurality of friction brake devices can be determined. It is conceivable for wear data to be stored which are assigned to an individual friction brake device in each case. The step involved in actuating the brake system by means of the brake control device can be provided based on wear data. In this case, the brake control device can actuate the plurality of friction brake devices asymmetrically based on wear data. The brake system may be a pneumatic brake system in which at least one friction brake device is operated pneumatically. A signal can be emitted based on wear data, the signal containing maintenance information in relation to the at least one friction brake device. It may be provided that a sensor device connected to the brake control device transmits data to the brake control device, on the basis of which the brake control device determines the load.

FIG. 1 shows schematically a brake system 10 of a rail vehicle. Mechanical and pneumatic connections and lines are depicted by solid lines, while electrical connections or communication channels are depicted by dotted lines. To provide a clear overview, the electrical control lines for the components assigned to the second wheel are not shown. These are, however, comparable to the control lines assigned to the first wheel and its components. The brake system 10 is provided to slow down wheels 12 and 13 of the rail vehicle. It is envisaged in this example that the wheels 12 and 13 are located on different wheel axles. A first brake block 14 is assigned to the first wheel 12.

A second brake block 15 is assigned to the second wheel 13. Each of the brake blocks 14, 15 has a brake lining which brakes the associated wheel 12, 13 when the brake block 14, 15 with the brake lining is pressed onto the tread of the associated wheel 12, 13. The brake lining is subject to wear in this case, which is reflected in, among other things, the wearing of the brake lining. The brake block 14 can be operated by an actuator 16. The actuator 16 is connected to a main control valve device 20 via a supply line.

Compressed air can be fed to the actuator 16 via the main control valve device 20. Similarly, an actuator 17 is assigned to the brake block 15, which can likewise be supplied with compressed air for operating the actuator via the main control valve device 20, to bring the brake block 15 into contact with the tread of the wheel 13. The main control valve device 20 is connected to a compressed air storage device 22 from which it can remove compressed air, to provide the actuators 16, 17 with compressed air during braking. The brake system 10 in this example is therefore configured as a pneumatic brake system. In addition, an electronic brake control device 24 configured as a brake calculator is provided, which is able to actuate the main control valve device 20. For this purpose, the main control valve device 20 may particularly exhibit one or a plurality of solenoid valves which can be actuated by the brake control device 24.

At least one brake pressure sensor device which is not shown may be connected to the brake control device 24 for communication. A brake pressure sensor device of this kind may determine a brake pressure provided by the main control valve device 20 and/or the effective brake pressure for operating the individual actuator in each case and convey it to the brake control device 24. The brake control device 24 may be designed to carry out actuation of the brake system or its valve devices based on pressure data, which is transmitted by a brake pressure sensor device of this kind. In addition, a load sensor 18 is assigned to the first wheel 12, which is capable of determining a load exerted on the brake block 14 during braking, for example a braking force and/or a brake torque.

A load sensor of this kind may, for example, exhibit one or a plurality of expansion measuring strips. The sensor 18 is connected to the electronic brake control device 24 for the transmission of data. In addition, a first wheel speed sensor 30 is assigned to the wheel 12, which is able to detect the speed of the wheel 12. This sensor is also connected to the electronic control device 24 for data transmission. Similarly, a second load sensor 19 is assigned to the second wheel, which can determine a load exerted on the brake block 15, such as a braking force and/or a brake torque. In addition, a second wheel speed sensor 32 is assigned to the second wheel 13. The actuators 16, 17 may each comprise pneumatic cylinders, which exert a braking force on the associated brake block 14, 15 when exposed to a brake pressure.

The actuators 16, 17 may each have a valve device that can be actuated by the electronic control device 24, via which a main brake pressure supplied by the main control valve device 20 can be individually modified for the pneumatic cylinder of the actuators 16, 17 in each case. In this way, the actuators 16, 17 in particular can apply different brake pressures to the brake blocks 14, 15 in accordance with the electronic control device 24 and thereby operate the friction brake devices asymmetrically.

In FIG. 1 the actuator 16 with the brake block 14 can be regarded as the first friction brake device. The actuator 17 and the second brake block 15 can be regarded as the second friction brake device. It is clear that both friction brake devices may exhibit associated brake linkages and suspensions which are not shown. The first and second friction brake device and the main control valve device 20 may be regarded as a pneumatic brake device which can be actuated by the brake control device 24. The friction brake devices may also be configured as disk brakes rather than as block brakes. In this case too, a load sensor may be provided in each case which is able to detect a braking force exerted during braking and/or a brake torque and transmit it to the electronic brake control device 24. The brake control device 24 is configured to receive data from the sensors 18 and 19 and to determine a load for the associated friction brake device of the first wheel 12 or the second wheel 13 in each case based on these data.

The electronic brake control device 24 calculates wear data from the determined load, in this example an energy application to the respective friction brake device occurring during braking. A parameter is stored for each friction brake device or each brake lining of the brake blocks 14, 15, which parameter may represent a total energy application over a plurality of brake applications.

Figure 2:
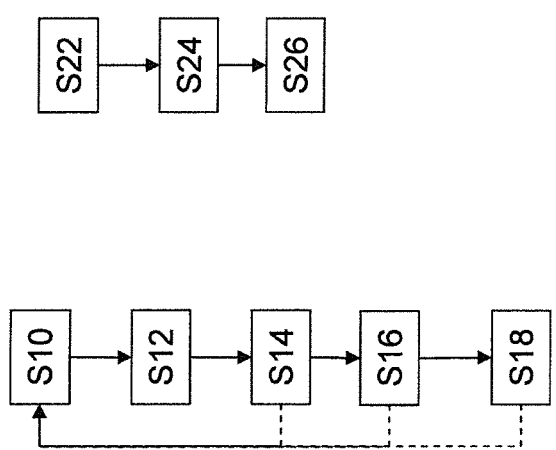
FIG. 2 shows a flow diagram in schematic form of a method of operating a brake control device for a brake system of a rail vehicle.

FIG. 2 shows a flow diagram of a method of operating a brake control device for a brake system of a rail vehicle. In one step S10 of the method, a plurality of sensors of a sensor device, which may comprise sensors 18 and 19 in FIG. 1, for example, detect data relating to a load of a friction brake device assigned to a sensor in each case during a braking process. These data may, for example, relate to the braking force exerted on the associated friction brake device and/or an associated brake torque. In one step S12, an electronic brake control device, for example the electronic brake control device 24 in FIG. 1, receives the data detected and transmitted by the sensors.

In a following step S14, the control device determines the load in each case and/or the progress of the load over time for an associated friction brake device based on the data received. The load may be parameterized as the energy application to a friction brake device during braking, for example. In one step S16, the brake control device calculates associated wear data for each friction brake device based on the determined load. It is provided, for example, that the brake control device determines an associated total energy application over a plurality of brake applications for each friction brake device. For this purpose, the brake control device may read out a hitherto total energy application for each friction brake device, which is stored in the memory device, and increase it by adding an energy application produced during a current brake application, to obtain a current total energy application. This adjustment may take place after braking or during braking in individual steps.

In one step S18 following step S16, the brake control device stores the wear data, for example the updated total energy application, for each friction brake device. It is also conceivable that steps S16 and S18 are carried out after braking. Steps S10 to S14 may be repeated during a braking process until the braking process has ended and moved on to step S16. It is also conceivable for steps S10 to S16 or S10 to S18 to run in loops during braking. Based on stored data, in the event that braking is provided for, a brake control is carried out. The brake control may take place parallel to or independently of the steps described S10 to S18, in which wear data are determined and stored.

This brake control is based on existing stored wear data. A comparison of wear data for individual friction brake devices can be carried out in a step S22. With this comparison, it is particularly possible to identify which friction brake devices have hitherto been subject to particularly high wear and which are subject to lower wear, wherein wear can be parameterized by the wear data, particularly by a total energy application. In one step S24, an asymmetric distribution of brake pressure or brake current can be calculated based on this comparison and based on a predetermined braking requirement.

With this asymmetric distribution of brake pressure or brake current for operating the friction brake devices, friction brake devices which have hitherto been subject to low wear are exposed to a higher brake pressure or brake current than friction brake devices which have hitherto been subject to greater wear. Consequently, higher brake energy is applied to the friction brake devices which have hitherto been subject to low wear, as a result of which the wear distribution over a plurality of friction brake devices can be balanced or else homogenized.

In one step S26, the asymmetrical actuation of the friction brake devices takes place based on the result of step S24. In this case, a main control valve device, in particular, and valve devices assigned to individual friction brake devices can be actuated in such a manner that the desired calculated brake pressures or brake currents are set for the individual friction brake devices. Independently of the existence of braking, it may be provided that at regular intervals and/or at the end of a journey wear data, particularly total energy applications for individual friction brake devices, are compared with predetermined threshold values.

If wear data for individual friction brake devices exceed an assigned threshold value, the brake control device emits a suitable signal, to indicate an increased need for maintenance on the associated friction brake device. It may also be provided that the control device generally emits maintenance information based on wear data by presenting data of this kind on a display or on a maintenance computer unit, for example. A maintenance computer unit may be provided on the rail vehicle and/or may be an external computer unit which may be provided in a maintenance division, for example.

The features of the invention disclosed in the foregoing description, in the drawings and also in the claims may be crucial to the realization of the invention, both individually and also in any combination.

LIST OF REFERENCE NUMBERS

10 Brake system
12 First wheel
13 Second wheel
14 First brake block
15 Second brake block
16 First actuator
17 Second actuator
18 First load sensor
19 Second load sensor
20 Main control valve device
22 Compressed air storage device
24 Brake control device
30 First wheel speed sensor
32 Second wheel speed sensor

The invention claimed is:

1. A brake control device for a brake system of a rail vehicle, which determines a load of at least one friction brake device operated during a braking process, wherein the brake control device processes the determined load to determine wear data and additionally stores the wear data based on the determined load in a memory device, wherein the brake control device actuates a plurality of friction brake devices asymmetrically based on the wear data in order to balance the overall wear distribution over the plurality of friction brake devices.

2. The brake control device of claim 1, wherein the brake control device determines the load of a plurality of friction brake devices during a braking process and stores wear data for each of the friction brake devices, which are each assigned to the corresponding friction brake device.

3. The brake control device of claim 1, wherein the brake system is a pneumatic brake system which has at least one pneumatically operable friction brake device.

4. The brake control device of claim 1, wherein the brake control device emits a signal based on the wear data which contains maintenance information relating to the at least one friction brake device.

5. The brake control device of claim 1, wherein the brake control device is connected to a sensor device, which enables data to be transmitted to the brake control device, based on which the brake control device determines the load.

6. A brake system for a rail vehicle having a brake control device as claimed in claim 1.

7. A rail vehicle having a brake system and a brake control device as claimed in claim 1.

8. A method of operating a brake control device for a brake system of a rail vehicle, the method comprising:
determining, using the brake control device, a load of at least one friction brake device of the brake system actuated during a braking process;
processing, the load to determine wear data based on stored model parameters;
storing, using brake control device, the wear data based on the determined load;
based on the wear data, balancing the wear distribution over a plurality of friction brake devices, and
actuating a plurality of friction brake devices asymmetrically based on the wear data in order to balance the overall wear distribution over the plurality of friction brake devices.

* * * * *